US012045716B2

(12) United States Patent
Bercich et al.

(10) Patent No.: US 12,045,716 B2
(45) Date of Patent: Jul. 23, 2024

(54) FEDERATED LEARNING SYSTEM AND METHOD FOR DETECTING FINANCIAL CRIME BEHAVIOR ACROSS PARTICIPATING ENTITIES

(71) Applicant: Lucinity ehf, Reykjavik (IS)

(72) Inventors: Justin Bercich, Reykjavik (IS); Theresa Bercich, Reykjavik (IS); Gudmundur Runar Kristjansson, Gardabaer (IS); Anush Vasudevan, Monroe Township, NJ (US)

(73) Assignee: Lucinity ehf, Reykjavik (IS)

( * ) Notice: Subject to any disclaimer, the term of this patent is extended or adjusted under 35 U.S.C. 154(b) by 0 days.

(21) Appl. No.: 17/020,496

(22) Filed: Sep. 14, 2020

(65) Prior Publication Data

US 2021/0089899 A1    Mar. 25, 2021

Related U.S. Application Data

(60) Provisional application No. 62/902,503, filed on Sep. 19, 2019.

(51) Int. Cl.
*G06N 3/08* (2023.01)
*G06N 3/045* (2023.01)
(Continued)

(52) U.S. Cl.
CPC .............. *G06N 3/08* (2013.01); *G06N 3/045* (2023.01); *G06Q 30/0185* (2013.01); *G06Q 40/02* (2013.01); *G06Q 50/265* (2013.01)

(58) Field of Classification Search
CPC .... G06N 3/08; G06N 3/0454; G06Q 30/0185; G06Q 50/265; G06Q 40/02
See application file for complete search history.

(56) References Cited

U.S. PATENT DOCUMENTS 6,128,609 A * 10/2000 Rose ...................... G06N 3/08
706/25
10,282,658 B2 * 5/2019 Alvarez-Icaza Rivera ...................
G06N 3/04
(Continued)

FOREIGN PATENT DOCUMENTS

WO    WO-2018033890 A1 *  2/2018  ............... G06F 9/46

OTHER PUBLICATIONS

N. Prasad, R. Singh and S. P. Lal, "Comparison of Back Propagation and Resilient Propagation Algorithm for Spam Classification," 2013 Fifth International Conference on Computational Intelligence, Modelling and Simulation, Seoul, Korea (South), 2013, pp. 29-34, doi: 10.1109/CIMSim.2013.14. (Year: 2013).*

(Continued)

*Primary Examiner* — Michael J Huntley
*Assistant Examiner* — Imad Kassim
(74) *Attorney, Agent, or Firm* — Lewis Rice LLC

(57) ABSTRACT

A method of updating a first neural network is disclosed. The method includes providing a computer system with a computer-readable memory that stores specific computer-executable instructions for the first neural network and a second neural network separate from the first neural network. The method also includes providing one or more processors in communication with the computer-readable memory. The one or more processors are programmed by the computer-executable instructions to at least process a first data with the first neural network, process a second data with the second neural network, update a weight in a node of the second neural network by a delta amount as a function of the processing of the second data with the second neural network, and update a weight in a node of the first neural network as a function of the delta amount. A computer system for updating a first neural network is also disclosed.

(Continued)

Other features of the preferred embodiments are also disclosed.

16 Claims, 5 Drawing Sheets

(51) Int. Cl.
  *G06Q 30/018* (2023.01)
  *G06Q 40/02* (2023.01)
  *G06Q 50/26* (2012.01)

(56) References Cited

U.S. PATENT DOCUMENTS

| | | | |
|---|---|---|---|
| 10,572,800 B2* | 2/2020 | Wang | G06N 3/08 |
| 10,699,190 B1* | 6/2020 | Rotem | G06N 3/08 |
| 11,182,676 B2* | 11/2021 | Dasgupta | G06N 3/045 |
| 2018/0101765 A1 | 4/2018 | Chiang et al. | |
| 2018/0293488 A1 | 10/2018 | Dang et al. | |
| 2019/0012592 A1* | 1/2019 | Beser | G06N 3/0454 |
| 2019/0087712 A1* | 3/2019 | Sundaresan | G06N 3/045 |
| 2019/0385043 A1* | 12/2019 | Choudhary | G06F 13/4213 |
| 2020/0371491 A1 | 11/2020 | Wong | |
| 2020/0374711 A1* | 11/2020 | Honkasalo | H04W 24/02 |
| 2021/0034707 A1 | 2/2021 | Podgorny et al. | |
| 2021/0173824 A1* | 6/2021 | Chen | G06F 16/2358 |

OTHER PUBLICATIONS

Abadi et al. ("Deep Learning with Differential Privacy", CCS'16 Oct. 24-28, 2016) (Year: 2016).*

Qin et al. ("Making Deep Neural Networks Robust to Label Noise: Cross-Training With a Novel Loss Function", IEEE, Received Aug. 19, 2019) (Year: 2019).*

Yu et al. ("How does Disagreement Help Generalization against Label Corruption?", arXiv, May 12, 2019) (Year: 2019).*

Dutta, S., et al., "A Unified Coded Deep Neural Network Training Strategy Based on Generalized PolyDot Codes for Matrix Multiplication," 2018 IEEE International Symposium on Information Theory (ISIT), 2018, 49 pages.

Mirjalili, V., et al., "Semi-Adversarial Networks: Convolutional Autoencoders for Imparting Privacy to Face Images," 2018 International Conference on Biometrics, 2018, pp. 82-89.

Phan, N., et al., "Differential Privacy Preservation for Deep Auto-Encoders: An Application of Human Behavior Prediction," Proceedings of the AAAI Conference on Artificial Intelligence, 2016, pp. 1309-1316, vol. 30, No. 1.

Youkawa, Tetsuya et al., "Delayed Weight Update For Faster Convergence in Data-Parallel Deep Learning," Nov. 26, 2018 (5 pages).

* cited by examiner

FIG. 1B

Characteristics of entities
PII Data

- credit history
- criminal record
- criminal history
- drug use history
- medical history
- hospital record
- police report
- tracking history
- name
- age
- residential address
- business address
- address of a family relative
- address of a business associate
- educational history
- employment history
- data from social media
- bank account number
- plurality of banking information data
- banking location
- purchase history
- purchase location
- invoice
- transaction date
- financial history

FIG. 2

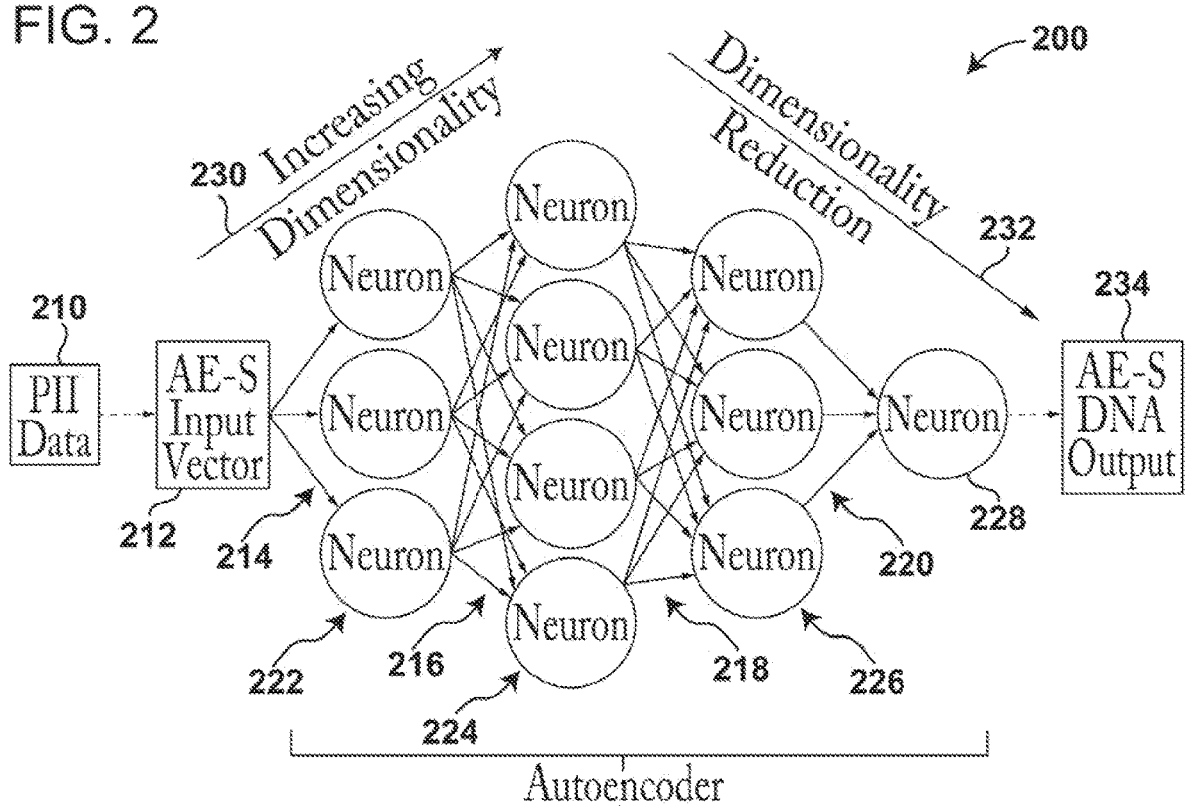

FEDERATED LEARNING SYSTEM AND METHOD FOR DETECTING FINANCIAL CRIME BEHAVIOR ACROSS PARTICIPATING ENTITIES

CROSS REFERENCE TO RELATED APPLICATIONS

This application claims the benefit of U.S. Provisional Application No. 62/902,503, filed on Sep. 19, 2019, the entirety of which is incorporated by reference herein.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

REFERENCE TO A SEQUENCE LISTING, TABLE, OR COMPUTER PROGRAM LISTING APPENDIX SUBMITTED ON A COMPACT DISC AND AN INCORPORATION-BY-REFERENCE OF THE MATERIAL ON A COMPACT DISC

Not applicable.

FIELD OF THE INVENTION

The invention relates to the field of "federated learning" and its use in conjunction with machine learning models to detect illicit financial crime behaviors including but not limited to money laundering. In particular, the invention relates to the use of "federated learning" in the process of model training and inference and the use of machine learning more generally.

BACKGROUND OF THE INVENTION

The financial industry has traditionally maintained a highly decentralized system where entities utilize highly encrypted and/or secure data 'silos' in which transaction, customer, and other information is kept on premise (or in dedicated cloud vault) and accessible only to that legal entity. This system has largely precluded the sharing of information between entities, other than with regulatory competent authorities, including entities interlinked through a common international or domestic parent entity. The primary driver for maintaining decentralization is concerns regarding data leakage, regulatory and commercial requirements for data security, and the risk to an entity that competitors could gain insights from their data. While maintaining a state of isolation, financial entities have from a data perspective disregarded that financial markets and their actors are highly interlinked networks not operating: remotely but rather connectively. Thus, the ability to learn insights from one bank and then apply that knowledge to detect money laundering or other financial crimes in another bank, would increase the accuracy of overall illicit activity detection while increasing efficiency and saving time for analysts assessing a potential case. The cumulative gain from participating in this system lies in the synergies harnessed by accruing knowledge learned from customers' behavior in each entity, with the improved tuning of detection models benefiting all participating entities significantly and equally, without the need to share underlying customer data.

SUMMARY OF THE INVENTION

A method of updating a first neural network provides a computer system with a computer-readable memory storing specific computer-executable instructions for the first neural network and a second neural network separate from the first neural network. The method also provides one or more processors in communication with the computer-readable memory. The one or more processors are programmed by the computer-executable instructions to at least process a first data with the first neural network and process a second data with the second neural network. The one or more processors are further programmed by the computer-executable instructions to at least update a weight in a node of the second neural network by a delta amount as a function of the processing of the second data with the second neural network and update a weight in a node of the first neural network as a function of the delta amount.

A computer system for updating a first neural network includes a computer memory storing specific computer-executable instructions for the first neural network and a separate second neural network. The computer system also includes one or more processors in communication with the computer-readable memory. The one or more processors are programmed by the computer-executable instructions to at least process a first data with the first neural network and process a second data with the second neural network. The one or more processors are further programmed by the computer-executable instructions to at least update a weight in a node of the second neural network by a delta amount as a function of the processing of the second data with the second neural network and update a weight in a node of the first neural network as a function of the delta amount.

Other objects and features will be in part apparent and in part pointed out hereinafter.

BRIEF DESCRIPTION OF THE SEVERAL VIEWS OF THE DRAWING

FIG. 1B is an expansion of the memory 104 in FIG. 1A to show a non-exclusive list of the additional types of data that may be stored concerning characteristics of entities.

FIG. 2 shows a single autoencoder for anonymizing data that amalgamates all of the relevant PII data fields.

Corresponding reference characters indicate corresponding parts throughout the drawings.

DETAILED DESCRIPTION OF THE INVENTION

Figure 1A:
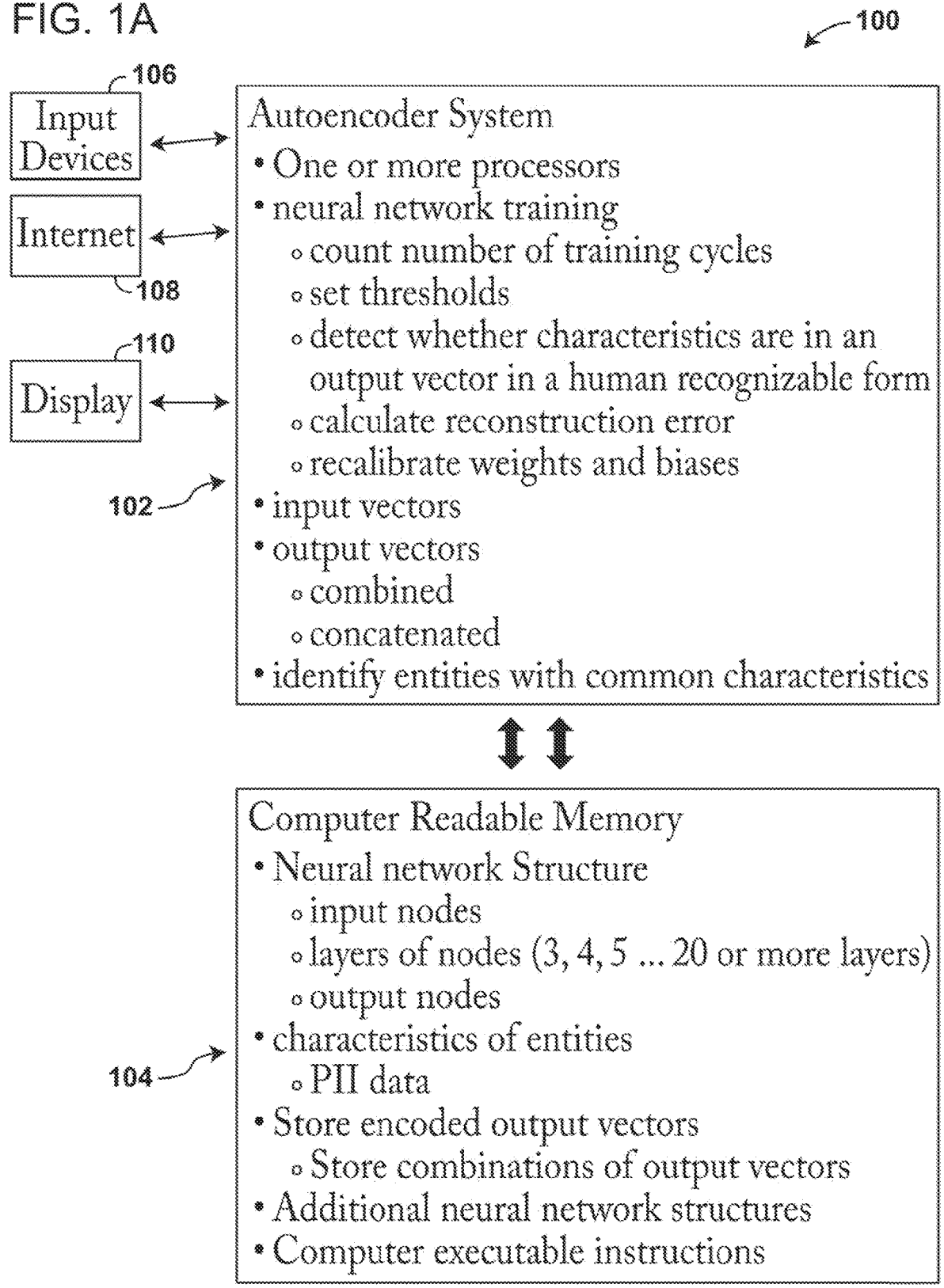
FIG. 1A shows a computer system for anonymizing data.

The present system provides a cloud-based solution that uses federated learning to achieve the goat of a unified, holistic and accurate detection and analysis of money laundering (or other type of financial crime) behavior for financial entities devoid of the need to cross share client data between entities themselves.

In practice, deep learning detection models are first developed and trained for each individual entity. Every single entity possesses properties that make it unique such as the composition of their customers, the entity location, and usage and frequency of specific financial products, which entails that each entity has a certain kind of specificity that sets it apart from others. Each entity is assigned a model for individual behaviors (e.g. for money laundering) so that complex nuances and differences across entities can be learned by the model, thus optimizing the model's suitability for detection in that entity. This also ensures that model accuracy is not eroded by cross training which would result in the generalization of inference such that the important structural differences between entities would be disregarded. Models for a specific behavior have the same architectural properties across all entities and are re-trained using the specific entity's data and feedback.

Breakthroughs in Artificial Intelligence and advanced applied Machine Learning in recent years have made it possible to explain previous Blackbox algorithms through several mathematical techniques. In its simplest form these calculations provide insights into the inner workings of deep neural networks and how they learn/optimize. These state-of-the-art techniques are then applied to each entity's model. The information that is extracted through this mathematically explains how the models' weights have changed after being re-trained using their own feedback data. These scores, technically referred to as feature importance differential values, are then inputted into a supra deep learning neural network, which sits on top of all models concerning this behavior. The scores extracted from each entity are aggregated, as all entities will update their models based on insight learnt from the behavior of their clients. This aggregation of their differential scores is then combined with the weights of a single entity's neural network model, and then inputted into a supra neural network. This supra neural network is specifically trained offline to extract information from these differential scores which is then used to update the entity's neural weights, essentially shifting the entity's weights in a way that integrates both feedback learnt from their individual clients and information from the other entities' partial derivative scores, which implicitly impound information about those entities' feedback and contextual situation, whilst still preserving each entity's model specificity and without sharing any raw client data.

This approach elegantly handles several issues that used to exist in this domain. Firstly, it completely maintains the integrity and safety of each entity's data as the data itself is never shared in any form. Thus, data does not leave the entity's own firewalls set up within a secure cloud or other systems such as systems on-premise at the client. Secondly, it maintains specificity in the models such that models are optimized based on the individual circumstances of entities. Thirdly, it learns from partial derivative information derived from other participating entities in a way that improves accuracy and detection.

In use, the mathematical process of Feature Importance Delta scores, $\Delta$, is calculated for each and every weight in the deep learning models so as to be able to match to the current neuronal weight scores. Delta scores are calculated by chaining derivative equations together for each weight propagating backwards from the output towards the input and then calculating the differential between $MA_0$ weights and $MA_1$ weights and/or the differential between $MA_0$ and $MA_1$ feature importance scores. These delta scores and the model weights of $MA_1$ are then flattened and concatenated into a single vector. This new vector serves as input into a supra learning model. This model has been trained to calculate adjusted weights based on the delta scores given the current weights of $MA_1$ so as to not lose the specificity of $MA_1$ but to integrate the learned findings of differential score $\Delta_{MB}$ of model B. These adjustments are not simply done in a new weights=$MA_1 - \Delta_{MB}$ fashion as this would distort the delicately trained weights too much to maintain the clients' specificity. Therefore, the learning approach (and, preferably, the deep learning approach) is taken to find optimally recalibrated weights to arrive at model $MA_2$. Model $MA_2$ is then used in the production process instead of $MA_0$ and the entire process is indefinitely repeated.

As a matter of security, some entities might prefer to use autoencoder-based data anonymization systems and methods to encrypt their data at the outset before attempting to detect particular behaviors. FIGS. 1A to 4 disclose such systems and methods. More particularly, ctn autoencoder system can maintain anonymity and preserve the relational content between and among PII data while still encoding it in a safe manner. Therefore, the data can still be used for network analysis, deduplication efforts and can generally serve as an input into machine-learning models to detect complex patterns whose accuracy and veracity is enhanced by the inclusion of this encoded PII data in the analysis. Business and research areas alike should be able to utilize this encoded data for analysis, without having to have access to the original data. This is especially applicable in (but not restricted to) the financial sector for the purposes of fraud detection and anti-money laundering efforts, and in the healthcare sectors, allowing third party providers and researchers to work with a more complete dataset than ever before without revealing any actual PII data.

Additionally, there may be reasons to encode other forms of data other than data typically considered to be PII. For example, there may be a need to encode financial, engineer, testing, or other data in order to ensure that the data itself is not easily digested by unauthorized sources. Regardless of the content of the data processes, conventional means for anonymizing data, such as hashing functions, may be less than ideal for the following reasons. First, conventional hashing functions do not suffice for the purposes of further elaborate and more complex analysis as the information content within the data is lost. One of the main attributes of hashing is that two similar inputs into a hashing algorithm provide whenever possible very different output hashes to maximize the security of the encrypted data. However, this means that slightly misspelled names, or zip codes that are nearly identical, produce very different hashes and it is mathematically near impossible to ascertain which data has a relational connection, be it geo-spatial proximity or detection of entities that are related. In order to analyze such data, it is thus normally decrypted leaving it vulnerable. However, the inventions disclosed herein may provide data that may be analyzed in such situations without access to the original data that has not been encoded.

The autoencoder system, such as that generally shown in FIG. 1A, takes PII data as input, increases its dimensionality in a latent space, performs mathematical operations including a form of dimensionality reduction, and then arrives at an encoded output of data which can be used for further analysis. The novelty of this approach is two-fold: Firstly, the usage of deep learning algorithms as a system for encryption; and secondly, the usability of PII data after being unidentifiably encoded while maintaining the relational position of the PII data to each other. The mathematical theory of pattern recognition and the near impossible exact replicability of a model are harnessed as main strengths in the autoencoder system to encode personal identifiable information (PII) for the purpose of further analysis.

Figure 3:
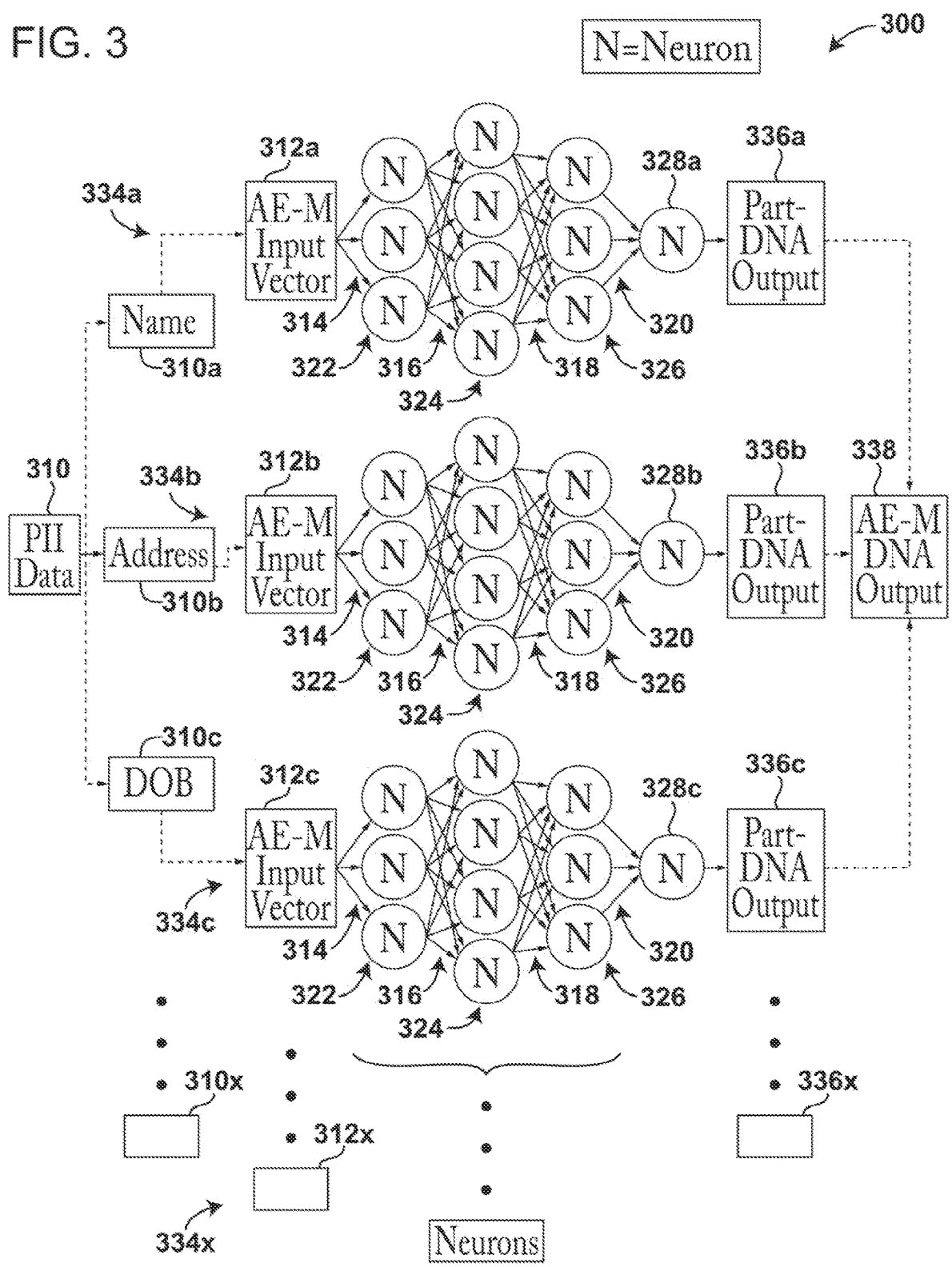
FIG. 3 shows multiple autoencoders for anonymizing data where the autoencoders are assigned and trained on a specific PII data field and their respective outputs are combined.

Two systems are devised to achieve this result for different applications. As seen in FIG. 2, the first system uses a 'single' autoencoder that amalgamates all relevant PII data fields and trains a unique autoencoder model with attached neuron weights. As seen in FIG. 3, the second system contains 'multiple' autoencoders, where each autoencoder is assigned and trained on a specific PII data field mapping each input to its own autoencoder, e.g. first names and last names have their own autoencoder to maximize security concerns as all parameters, hyper-parameters, architectural properties and the training dataset has to be present to be able to attempt the decryption of the output. Neither of these systems has been previously used to provide useful, anonymized data.

More particularly, FIG. 2 shows a graphic that depicts the PII data schematic 210 which indicates the directional flow of data through the Singular Autoeneoder (AE-S) system 200. The PII Data 210 is transformed into a feature vector format and serves as an input into the input nodes AE-S 212. The autoencoder 200 is represented by its neurons and their connections. A neuron is a mathematical entity in which an activation function is applied to a calculated value to arrive at an interim transitional output value, which through a series of directional connections informs the mathematical transformations applied to the data as it flows through the AE-S system, analogous to a computational graph, visually from left to right.

The PII data 210, which is split into a feature vector, is fed into the autoencoder AE-S system as a single data vector at 212. The solid lines (214, 216, 218, 220) connect the input 212, through each of the layers of neurons (222, 224, 226) to the output layer 228 represent a complex mathematical transformation in which a myriad of combinatorial compositions of the input is analyzed. Output layer 228 has the same dimensionality as the input node 212. Concretely this means that we take the input feature vector $x_0$ and perform the following transformation on it, $n_1 = w_{i,0}^T x_0 + b_0$, where w is a matrix of trainable weights, b is a bias term vector, and i is the relevant neuron in the input layer, to compute the neuronal input of neuron $n_1$ in the adjacent layer. Further, within each neuron itself, an activation function is applied so that $z_1 = \varphi(n_1)$ where $\varphi$ represents the chosen activation function and $z_1$ is the neuronal output. The input into a neuron in the next layer would thus be $n_2 = z_1 w_{j,1} + \ldots + z_j w_{j,k} + b_{j,k}$, where j is the relevant neuron in the previous layer, k is the relevant neuronal connection in the current layer, $b_{j,k}$ is the relevant bias and the weight subscripts indicate the neuronal layer and the relative position of the neuron, which amounts to $n_2 = w_{j,k}^T z + b_{j,k}$ in matrix format, which is activated in the new neuron again. This creates a deep abstraction from the original input data through chained equations.

An additional layer of abstraction is provided by the architecture of the autoencoder itself as the dimensionality of the data is significantly increased as shown by arrow 230 from "a" input neurons where b>a neurons in the deeper layers of the network. Dimensionality reduction as shown by arrow 232 thereafter occurs to transform the larger layers, e.g. layer 224, to an output layer 228 having the same dimensionality as the dimensionality of the input node 212. The output of the system provided at a schematic box 234 is a deep abstraction of the original PII input data 210 and thus is not replicable without the exact same autoencoder system 200 in place and, even then, replication is a very complex undertaking.

In a preferred embodiment, the autoencoders 200 in FIG. 2 and 334a, 334b & 334c in FIG. 3 may preferably contain the same number of nodes in the first layer of nodes as in the third layer of nodes. In another preferred embodiment, the first, second and third layers of nodes in the autoencoders 200 in FIG. 2 and 334a, 334b & 334c in FIG. 3 may contain three nodes, five nodes, up to 25 nodes, up to 50 nodes, or up to 500 nodes. In another preferred embodiment, the input node and the output node in the autoencoders 200 in FIG. 2 and 334a, 334b & 334c in FIG. 3 may be single nodes. In another preferred embodiment, the input vector and the output vector of the autoencoders 200 in FIG. 2 and 334a, 334b & 334c in FIG. 3 may have the same length. The features of these preferred embodiments may also be combined together.

However, the AE-S outputs provide a transformed representation of the original PII vector data 240, resulting in an output vector at 234 that has both pseudonymized the data, while also being trained to create a 'DNA' or representation of the data that is analyzable and comparable with other output vectors. This is achieved by the training process of the system (explained more fully in FIG. 4, below) before the output vectors at 234 are used for analysis. The aforementioned trainable weights vector w is optimized during a process of optimization called backpropagation during which the model is exposed to synthetic data to learn the optimal abstract representation of it, thereby preserving the inherent information content in the data.

Natural language processing distances are calculated from various base features to transform the PII data 210 into numerical data, which is provided as input into AE-S at node 212. Autoencoders aim to find deep abstractions of the data as originally input while minimizing the reconstruction error, which describes the distortions and shifts of the underlying distributions of the recreated abstract data compared to the original input data. An output vector reconstruction error is determined by calculating a function of the encoded output vector and the input vector. The objective of minimizing the reconstruction error through backpropagation is attained by back propagating the output vector reconstruction error back through the neural network from the output nodes back to the input nodes by a chained derivative of the outputs and weights of the intervening nodes. This results in the weights iteratively being recalibrated to minimize the reconstruction error in each training step. Generally speaking, these models undergo thousands, if not more, training steps to arrive at the optimal setting.

The graphic in FIG. 3 depicts the schematic of the PII data 310 flowing through the developed Multiple Autoencoder (AE-M) system 300. The PII data 310 is split into its respective parts (310a, 310b, 310c . . . 310x) and a natural language processing distance is calculated from various base features to turn the data into numerical values. The PII data categories are then used as an input vector into the first node (312a, 312b, 312c . . . 312x) of their own respective autoencoder (334a, 334b, 334c . . . 334x) to arrive at a partial output (336a, 336b, 336c . . . 336x). All of the partial outputs (336a, 336b, 336c . . . 336x) from every autoencoder are then mathematically combined to arrive at the final output 338. Concatenation is a preferred method of combining the encoded output vectors, although any other combination of the encoded output vectors is within the scope of the invention.

FIG. 1B is an expansion of the memory 104 in FIG. 1A to show a non-exclusive list in memory 104a of the additional types of data that may be stored in memories 104 and 104a concerning characteristics of entities.

In view of the above, it is seen that FIGS. 1A, 1B, 2 & 3 show an auto-encoder system 100 for anonymizing data associated with a population of entities. A computer memory 104 stores specific computer-executable instructions for a neural network, wherein the neural network comprises: input nodes; a first layer of nodes for receiving an output from the input nodes; a second layer of nodes for receiving an output from the first layer of nodes; one or more additional layers of nodes for receiving an output from the second layer of nodes; and output nodes for receiving an output from the last inner layer of nodes to provide an encoded output vector. An inner layer of nodes includes a number of nodes that is greater than a number of nodes in a layer of nodes on the input side of such inner layer and is also greater than a number of nodes in a layer of nodes on the output side of such inner layer. One or more processors 102 are in communication with the computer-readable memory 104 and are programmed by the computer-executable instructions to at least obtain data identifying a plurality of characteristics associated with at least a subset of the entities in the population and prepare a plurality of input vectors that include at least one of the plurality of characteristics, wherein the characteristics appear in the respective input vectors as numerical information transformed from a human recognizable text. The one or more processors 102 also train the neural network with the plurality of input vectors, wherein the training comprises a plurality of training cycles. In practice, it is contemplated that up to 10 processors 102, up to 50 processors 102, up to 100 processors 102, up to 500 processors 102, or even up to 1000 processors 102 may be used. The preferred embodiments can be made scalable such that any number of processors may be used based on the number of entities and the number of characteristics to be encoded or tracked. In practice, the neural network can have 7 inner layers of nodes, 11 inner layers of nodes, 21 inner layers of nodes, or even 51 inner layers of nodes—so long as the inner layers of nodes between the input nodes and a central layer of nodes provide increasing dimensionality and so long as the inner layers of nodes between such central layer of nodes and the output node provide decreasing dimensionality.

FIG. 1A also includes input devices 106 such as a keypad, mouse, touchscreen, graphic user interface and such other commonly known input devices to those of ordinary skill in the art. Input devices 106 as well as an internet connection 108 and a display 110 are provided for use in storing computer executable instructions in memory 104 and retrieving same, operating the processors in system 102, providing inputs needed to train the various neural networks disclosed herein, storing and retrieving data needed for such training in memory 104, storing and retrieving encoded data in memory 104, reviewing the results of the operation of the preferred embodiments, and such other uses as required for the functioning of the preferred embodiments.

Figure 4:
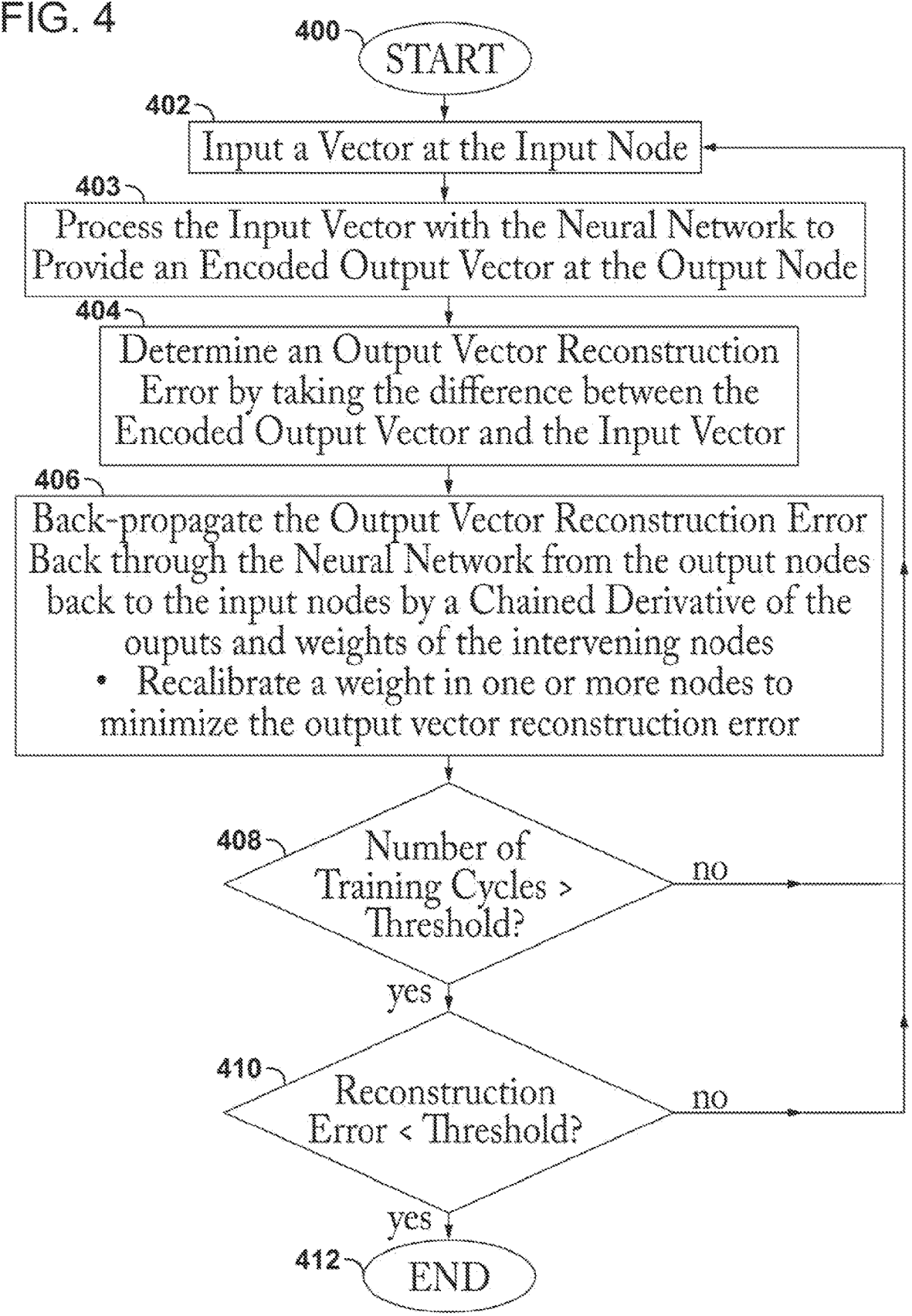
FIG. 4 shows a routine for training a neural network to anonymize data.

As seen in FIG. 4, a training cycle begins at the START 400. A training cycle comprises: the step 402 of inputting one of the input vectors at the input node; the step 403 of processing said input vector with the neural network to provide an encoded output vector at the output node; the step 404 of determining an output vector reconstruction error by calculating a function of the encoded output vector and the input vector; the step 406 of back-propagating the output vector reconstruction error back through the neural network from the output nodes back to the input nodes by a chained derivative of the outputs and weights of the intervening nodes; and recalibrating a weight in one or more of the nodes in the neural network to minimize the output vector reconstruction error.

The one or more processors 102 can also be programmed to set a threshold for a total number of training cycles and to stop the training of the neural network at step 408 in response to the number of training cycles exceeding the threshold. The one or more processors 102 can also be programmed to set a threshold as a function of a loss plane of the output vector reconstruction error and stop the training of the neural network at step 410 in response to the output vector reconstruction error being less than the threshold. The one or more processors can also be programmed to determine whether one of the characteristics in a plurality of selected input vectors is not also found in a human recognizable form in the respective encoded output vectors. This detection method may be based on use of additional input vectors having a same length as the additional encoded output vectors; and detecting that the output vector is not equal to the input vector or b detecting that more than 10%, 25%, or 50% of a plurality of values comprising the additional input vectors are different than a plurality of corresponding values in the respective additional encoded output vectors. Upon such detection, the one or more processors may fix the weights and biases in one or more of the nodes in the neural network.

In use after training, the one or more processors 102 may be programmed by the computer-executable instructions to fix the weights in one or more of the nodes in the neural network; and process a plurality of additional input vectors through the neural network to provide a plurality of respective additional encoded output vectors at the output node. A plurality of respective additional encoded output vectors will contain a plurality of characteristics, but said plurality of respective additional encoded output vectors will not contain said plurality of characteristics in a human recognizable form using any of the detection methods described above.

In use after training, the one or more processors 102 may be programmed by the computer-executable instructions to fix the weights in one or more of the nodes in the neural network; and process a plurality of additional input vectors through the neural network to provide a plurality of respective additional encoded output vectors at the output node. The majority of the respective additional encoded output vectors will contain a plurality of characteristics, but said majority of respective additional encoded output vectors will not contain said plurality of characteristics in a human recognizable form using any of the detection methods described above.

In use after training, the one or more processors 102 may be programmed by the computer-executable instructions to fix the weights in one or more of the nodes in the neural network; and process a plurality of additional input vectors through the neural network to provide a plurality of respective additional encoded output vectors at the output node. More than 90% of the respective additional encoded output vectors will contain a plurality of characteristics, but more than 90% of the respective additional encoded output vectors will not contain said plurality of characteristics in a human recognizable form using any of the detection methods described above.

The one or more processors 102 are also programmed to determine whether one of the plurality of characteristics in one of the input vectors is also found in a human recognizable form in the respective encoded output vector; and perform a plurality of additional training cycles in response to the respective encoded output vector containing said one of the plurality of characteristics in the human recognizable form using any of the detection methods described above.

The one or more processors 102 may be programmed to perform more than 100 training cycles, more than 1,000 training cycles, or more than 5,000 training cycles.

As seen in FIG. 1B, the plurality of characteristics may comprise data stored in the memory 104 which data is associated with any three or more of the following: a piece of personally identifiable information, a name, an age, a residential address, a business address, an address of a family relative, an address of a business associate, an educational history, an employment history, an address of any associate, a data from a social media site, a bank account number, a plurality of data providing banking information, a banking location, a purchase history, a purchase location, an invoice, a transaction date, a financial history, a credit history, a criminal record, a criminal history, a drug use history, a medical history, a hospital record, a police report, or a tracking history.

As also seen in FIG. 1, the computer memory 104 may store specific computer-executable instructions for a second neural network and a third neural network, wherein the second and third neural networks each comprise: an input node; a first layer of nodes for receiving an output from the input node; a second layer of nodes for receiving an output from the first layer of nodes; a third layer of nodes for receiving an output from the second layer of nodes; and an output node for receiving an output from the third layer of nodes to provide an encoded output vector; wherein the second layer of nodes includes a number of nodes that is greater than a number of nodes in the first layer of nodes and is greater than a number of nodes in the third layer of nodes. The one or more processors are also programmed by the computer-executable instructions to train the second and third neural networks with the plurality of input vectors, wherein the training comprises a plurality of training cycles wherein the training cycles comprise, for each of the respective second and third neural networks: inputting one of the input vectors at the input node; processing; said input vector with the respective neural network to provide an encoded output vector at the output node; determining an output vector reconstruction error by calculating a function of the encoded output vector and the input vector; back-propagating the output vector reconstruction error back through the respective neural network from the output nodes back to the input nodes by a chained derivative of the outputs and weights of the intervening nodes; and recalibrating a weight in one or more of the nodes in the respective neural network to minimize the output vector reconstruction error. The one or more processors are programmed by the computer-executable instructions to combine the encoded output vector of the neural network, the second neural network and the third neural network to provide a combined encoded output vector. These three outputs may also be concatenated to provide a concatenated combined encoded output vector.

The one or more processors 102 mays also be programmed by the computer-executable instructions to prepare an input vector for the entities in the population; process said input vector with the neural network to provide an encoded output vector at the output node for each of the entities; and store the encoded output vectors in the memory 104 for subsequent use in identifying a common characteristic between two or more of the entities. The one or more processors 102 may also be programmed by the computer-executable instructions to compare the encoded output vectors to identify the two or more entities with the common characteristic.

Figure 5:
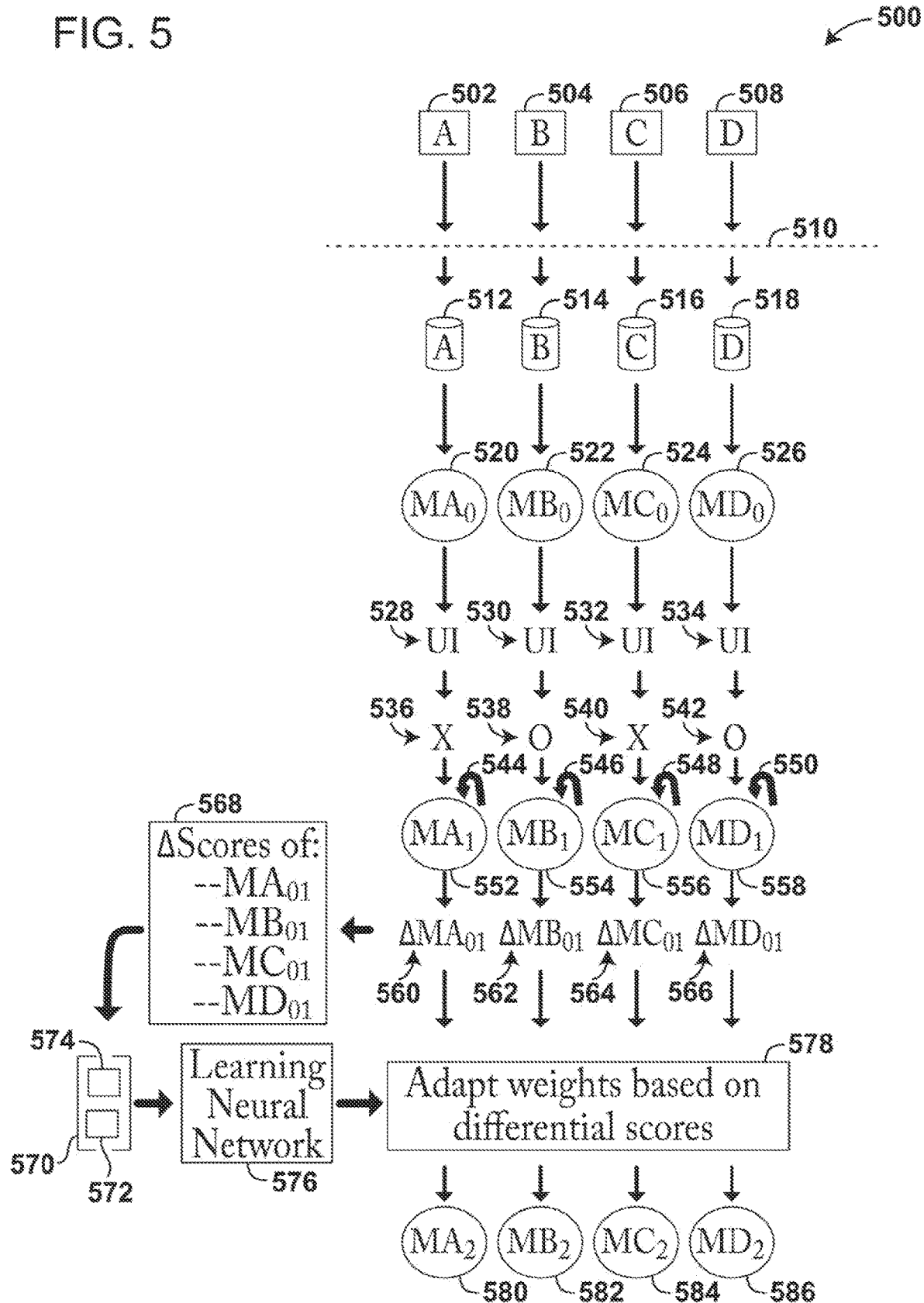
FIG. 5 shows an embodiment where multiple entities are able to share changes in the weights of the nodes in their neural network's to assist other entities in updating their own neural networks.

FIG. 5 shows a federated learning system 500 for use by, for example, four independent entities A, B, C, and D, which are also indicated, respectively, by reference numbers 502, 504, 506 and 508.

For example, for Entity A, the vertically aligned elements that bear an "A" in the left-most vertical position show the elements of the deep learning computer system used exclusively by Entity A. These include the data silo 512, neural network $MA_0$ indicated by reference number 520, updated neural network $MA_1$ indicated by reference number 552, the delta score in the weights for the neural network as it updates from $MA_0$ to $MA_1$ indicated with the nomenclature $\Delta MA_{01}$ and reference number 560, and the updated neural network $MA_2$ indicated by reference number 580.

Immediately to the right of the system used by Entity A is the deep learning computer system used for Entity B. The vertically aligned elements that bear a "B" show the elements of the deep learning computer system used exclusively by Entity B. These include the data silo 514, neural network $MB_0$ indicated by reference number 522, updated neural network $MB_1$ indicated by reference number 554, the delta change in the weights for the neural network as it updates from $MB_0$ to $MB_1$ indicated with the nomenclature $\Delta MB_{01}$ and reference number 562, and the updated neural network $MB_2$ indicated by reference number 582.

Immediately to the right of the system used by Entity B is the deep learning computer system used for Entity C. The vertically aligned elements that bear a "C" show the elements of the deep learning computer system used exclusively by Entity C. These include the data silo 516, neural network $MC_0$ indicated by reference number 524, updated neural network $MC_1$ indicated by reference number 556, the delta change in the weights for the neural network as it updates from $MC_0$ to $MC_1$ indicated with the nomenclature $\Delta MC_{01}$ and reference number 564, and the updated neural network $MC_2$ indicated by reference number 584.

Immediately to the right of the system used by Entity C is the deep learning computer system used for Entity D. The vertically aligned elements that bear a "D" show the elements of the deep learning computer system used exclusively by Entity D. These include the data silo 518, neural network $MD_0$ indicated by reference number 526, updated neural network $MD_1$ indicated by reference number 558, the delta change in the weights for the neural network as it updates from $MD_0$ to $MD_1$ indicated with the nomenclature $\Delta MD_{01}$ and reference number 566, and the updated neural network $MD_2$ indicated by reference number 586.

Although four Entities are shown in FIG. 5, any number of Entities are contemplated within the scope of the invention.

In use, Entity A stores its data in a very secure location indicated by data silo 512. As an extra precaution, Entity A may use the autoencoder disclosed above in FIGS. 1A, 1B, 2, 3 and 4 to encrypt its data thus rendering the data anonymous while simultaneously maintaining defining characteristics of the data available for analysis even in the encoded form. Either way, Entity A never shares its raw data or encoded data with any other third-party Entity.

Similar to Entity A, the other Entities B, C and D maintain their own respective data very securely in their own data silos 514, 516 and 518. Again, none of these Entities share their raw data or encoded data with any other Entity.

Turning back to Entity A, neural network $MA_0$ is trained by Entity A (or a confidential service provider) to detect the presence of a particular behavior based on the data stored in data silo 512 where Entity A stores its data. The particular behavior may indicate money laundering, financial criminality, or any other condition that Entity A may wish to detect. For a given piece of data processed by the neural network $MA_0$, the output of the network is graded by an analyst at the user-interface, U1, indicated by reference number 528. Once the output of the neural networks are shown to analysts via the user-interface, the interface collects feedback data in various forms on features, outputs, their relevance etc. Based on this feedback, the neural networks are retrained to become even more accurate in their decision making. The grade may be an "X" (not productive) or an "O" (productive). For a grade of "O," Entity A further investigates the underlying actors to determine whether a report should be made or any further action taken. The grade is also used to update the neural network as indicated by the curved arrow at reference number 544. The delta scores of the neural network are shown by $\Delta MA_{01}$ and are stored in a memory 568.

Turning now to Entity B, neural network $MB_0$ is trained by Entity B (or a confidential service provider) to detect the presence of a particular behavior based on the data stored in data silo 514 where Entity B stores its data. The particular behavior may indicate money laundering, financial criminality, or any other condition that Entity B may wish to detect. For a given piece of data processed by the neural network $MB_0$, the output of the network is graded by a decision maker U1 indicated by reference number 530. The grade may be an "X" (not productive) or an "O" (productive). For a grade of "O," Entity B further investigates the underlying actors to determine whether a report should be made or any further action taken. The grade is also used to update the neural network as indicated by the curved arrow at reference number 546. The change in the weights for the nodes of the neural network are shown by $\Delta MB_{01}$ at reference number 562 and are also stored in a memory 568.

Turning now to Entity C, neural network $MC_0$ is trained by Entity C (or a confidential service provider) to detect the presence of a particular behavior based on the data stored in data silo 516 where Entity C stores its data. The particular behavior may indicate money laundering, financial criminality, or any other condition that Entity C may wish to detect. For a given piece of data processed by the neural network $MC_0$, the output of the network is graded by a decision maker U1 indicated by reference number 532. The grade may be an "X" (not productive) or an "O" (productive). For a grade of "O," Entity C further investigates the underlying actors to determine whether a report should be made or any further action taken. The grade is also used to update the neural network as indicated by the curved arrow at reference number 548. The change in the weights for the nodes of the neural network are shown by $\Delta MC_{01}$ at reference number 564 and are also stored in a memory 568.

Finally, turning to Entity D, neural network $MD_0$ is trained by Entity D (or a confidential service provider) to detect the presence of a particular behavior based on the data stored in data silo 518 where Entity D stores its data. The particular behavior may indicate money laundering, financial criminality, or any other condition that Entity D may wish to detect. For a given piece of data processed by the neural network $MD_0$, the output of the network is graded by a decision maker U1 indicated by reference number 534. The grade may be an "X" (not productive) or an "O" (productive), For a grade of "O," Entity D further investigates the underlying actors to determine whether a report should be made or any further action taken. The grade is also used to update the neural network as indicated by the curved arrow at reference number 550. The change in the weights for the nodes of the neural network are shown by $\Delta MD_{01}$ at reference number 566 and are also stored in a memory 568.

In addition to updating their own respective neural networks based on their own experience processing their own data as explained above, the changes in the weights (560, 562, 564 and 566—all stored in memory 568) experienced by the other Entities may also be used to update the various neural networks. To set this up, each of Entities A, B, C and D would use the same or similar architecture in neural networks 520, 522, 524 and 526 and each such network would be separately trained to detect the presence of the same or similar behavior. If the Entities chose to use autoencoded anonymous data per the disclosure above concerning FIGS. 1A to 4, then that antoencoder would be set up using the same parameters and the same or similar architecture across each of the Entities. Most importantly, however, is that no raw data and no encoded data ever needs to be shared and the Entities are still able to assist each other with updating their respective neural networks.

This updating of neural networks between Entities occurs using Learning Neural Network 576 which has access to the changes in the weights stored in memory 568. For example, when network 520 owned by Entity A is to be updated with the changes in the weights for network 522 owned by Entity B, a processor (not shown) forms a vector 570 by concatenating the then current weights for Entity A's neural network $MA_1$ with the changes in the weights $\Delta MB_{01}$ that occurred during the updating shown by arrow 546 of Entity B's neural network. Network 576 is trained to thereby provide new weights at reference number 578 for Entity A's neural network at reference number 580. If Entity A wishes to obtain additional updates from the neural networks of Entities C and D, then network 576 repeats the updating process but using the change in weights for Entity C (564) and then Entity D (566).

Network 576 is equally available to the networks of the other Entities so each can update their own respective networks in a similar fashion as explained above for Entity A by using the change in weights experienced by the other networks. In updating the weights of one neural network using the changes in weights from another neural network, it is important that such updates not be too great or else the update might overwhelm the original weights.

In practice, the neural networks of Entities A, B, C and D can be trained to detect many different behaviors in a data set. For each different behavior, Entities A, B, C and D set up a discrete neural network having the same architecture for the network and data files. In this manner, the Entities may share the changes in the weights for each node in the neural networks (but not any data) in order to assist the other in updating their respective neural networks.

Examples of behaviors that may be detected as indicative of money laundering activity include, but are not limited to, frequent changes of financial advisers or institutions; selection of financial advisers or institutions that are geographically distant from the entity or the location of the transaction; requests for increased speed in processing a transaction or making funds available; failure to disclose a real party to a transaction; a prior conviction for an acquisitive crime; a significant amount of private funding from a person who is associated with, or an entity that is, a cash-intensive business; a third party private funder without an apparent connection to the entity's business; a disproportionate amount of private funding or cash which is inconsistent with the socio-economic profile of the persons involved; finance provided by a lender, other than a financial institution, with no logical explanation or economic justification; business transactions in countries where there is a high risk of money laundering and/or terrorism funding; false documentation in support of transactions; an activity level that is inconsistent with the client's business or legitimate income level; and/or an overly complicated ownership structure for the entity.

More generally, operation and use of the preferred embodiments reveal two components: Model Inference and Model Training. Model Inference refers to the process of post-training where, for example, Entity A's weights and Entity B's delta scores are input into the trained supra-neural network 576 (i.e. model recalculation network), and network 576 outputs a 'new' weight vector that then replaces Entity A's original weights. Inference is thus the 'prediction' of these new weights by the supra-neural network 576. Model Training refers to the process of training the weight recalculation network.

Further with regard to model inference, the inference of the model to determine the new weights for Entity A's network 552 based on the changes in the weights 562 for Entity B's updated network 544 would look like this: Take the weights of Entity A after its network 552 has learned from its own data. Then concatenate these weights from network 552 with the delta feature importance inference scores 562 and flatten these two matrixes into a vector 570. Vector 570 is then the input vector into the "supra" or learning neural network 576. Within the network 576, we calculate the new weights for neural network 552 that incorporate the learned feedback from neural network 554. This is preferably conducted recursively to first update network 552 with feedback from network 554 to arrive at the weight vector for network 580. The updated vector weights for network 552 are then updated again by concatenating them with the delta feature importance scores 564 to arrive at a new model weight vector for network 552. The process repeats until the weights for network 552 have been updated with all of the other relevant customers' feedback. The process next repeats in order to update network 554, and so on.

A separate task is training learning neural network 576. This is completely separate from training the Entitys' networks which have already been trained, and their weights and delta scores calculated. Once the network 576 is trained, Inference is conducted, and then the Entitys' networks are updated using the process described above. The training of network 576 is based on the principle that there should not be significant changes in the weights for the Entitys,' given the other delta scores of the other networks. Rather, the changes in the weights should just nudge them in the right direction.

There are at least three methods for training:

First Training Method

A first simple method of training is to include the delta scores of network 554 as bias terms/vectors into network 552, and then retrain network 552 given the addition of these biases. Another basic method is to apply to the weights an operation of some non-linear activation function of the delta scores. These processes are quite straightforward, and do not need an overarching 'supra-neural network'. One issue is that we do not 'learn' or optimize the underlying relationship between the weights and delta scores. For example, a simple subtraction would take away too much of the network's specificity for that particular Entity.

Second Training Method

The second process trains the supra-neural network 576 using a cost function based on the Entitys' underlying networks. The supra-neural network architecture is preferably a deep neural network that has input dimensions of 2x and output dimension of x. The input dimension could, for example, be composed of Entity A weights and Entity B's delta scores. The output dimension is thus equal to the length of the weight vector. The supra-network 576 is trained by feeding in examples of concatenated Entity A weights and Entity B delta scores, and then outputting 'new' Entity A weights, which are supplanted onto Entity A's network. The accuracy of Entity A's updated neural network is calculated. This serves as the cost function for the supra-neural network 576 which then undergoes backpropagation sending the signal back through the network, thus updating the weights of the supra-neural network 576. Such training is conducted by feeding a lot of samples of input vectors into the network 576, calculating the cost function, and then updating the weights accordingly.

Third Training Method

Similar to the second method, the training process consists of two parts: the first part is the neural network 576, which takes in the current model weights of network 552 and the delta feature importance scores 562 of network 554. It then runs the concatenated vector through the neural network (as explained above), which computes a set of new weights (which reduces the dimension from the input to the output vector since only one set of weights needs to be calculated for one network). The output of the neural network 576 is then provided to the second part of training.

The second part of training consists of pre-trained networks, which detect certain money laundering behaviors for a specific "entity", i.e. they simulate network 552, network 554, network 556, etc. These networks could be trained on synthetic data, for example. Network 552 and network 554 would detect a behavior on two separate sets of data, Dataset A and Dataset B. After the networks have finished with their own separate training process, a "sleeper" actor would be added into the dataset, which is more specific to either network 552 or network 554, that the networks at that current moment would not detect. A network 554 specific actor is then inserted into Dataset A. If the output from part 1 was a new weight vector for network 552, based on the "fake network 554" from the training environment, then the current weights of network 552 would be replaced with the new ones and run inference on the new Dataset A. This provides an accuracy score (because the number of actors in the dataset that conduct this specific illicit behavior is known). This accuracy score is fed back into part 1 of training the supra neural network, which learns from the given accuracy score and adapts its own weights according to this metric, which would govern the cost function. This is quite an intensive training process. However, since it must train a network's architecture, it must be known how the accuracy impacts the result to learn what the best adaptation operations are.

As used herein, second data has "the same or similar" predetermined data format as compared to first data in a predetermined data format when at least one of the following is true: (1) the data formats contain the same data fields; (2) the data formats contain the same data fields concatenated in the same order; (3) the data formats each contain a plurality of data fields and 95% of those data fields are the same; (4) the data formats each contain a plurality of data fields and 90% of those data fields are the same; (5) the data formats each contain a plurality of data fields and 80% of those data fields are the same; (6) the data formats each contain a plurality of data fields and 95% of those data fields have the same length; (7) the data formats each contain a plurality of data fields and 90% of those data fields have the same length; or (8) the data formats each contain a plurality of data fields and 80% of those data fields have the same length. Further, if two input vectors such as, for example, input vectors 212, 312a, 312b, 312c, as well as the input vectors to neural networks 520, 522, 524, and 526, are said to use the same or similar predetermined data formats, then, with respect to such same or similar input vectors, at least one of statements (1) to (8) herein would be true.

Further, as used herein, a second neural network has "the same or similar" predetermined network architecture as a first neural network with a predetermined network architecture when at least one of the following is true: (1) each neural network contains the same number of nodes as the other neural network; (2) each neural network coma ins the same number of nodes within 95% as the other neural network; (3) each neural network contains the same number of nodes within 90% as the other neural network; (4) each neural network contains the same number of nodes within 80% as the other neural network; (5) each neural network has the same number of layers and contains the same number of nodes in each layer as the other neural network; (6) each neural network has the same number of layers and contains the same number of nodes within 95% in each layer as the other neural network (7) each neural network has the same number of layers and contains the same number of nodes within 90% in each layer as the other neural network; (8) each neural network has the same number of layers and contains the same number of nodes within 80% in each layer as the other neural network; (9) each neural network has the same number of layers and at least three of those layers contain the same number of nodes; or (10) each neural network has the same number of layers and at least the input and output layers contain the same number of nodes.

An "entity" as used herein means a person, a company, a business, an organization, an institution, an establishment, a governing body, a corporation, a partnership, a unit of a government, a department, a team, a cooperative, or other group with whom it is possible to transact (e.g., to conduct business, or to communicate with, for example, on the internet or social media).

The data utilized in the methods of the invention include, but are not limited to, data regarding identity (e.g., height, weight, physical attributes, age, and/or sex); health-related data (e.g., blood pressure, pulse, genetic data, respiratory data, blood analysis, medical test results, personal disease history, and/or family disease history); personal data (e.g., relationship status, marital status, relatives, co-workers, place of work, previous workplaces, residence, neighbors, living address, previous living addresses, identity of household members, number of household members, usual modes of transportation, vehicles owned or leased, educational history, institutions of higher learning attended, degrees or certifications obtained, grades received, government or private grants, funding or support received, email addresses, criminal record, prior convictions, political contributions, and/or charitable contributions); personal information available from electronic devices used (e.g. phone records, text messages, voice messages, contact information, and app information); social media data (e.g., likes, comments, tags, mentions, photos, videos, ad interactions, and/or click information); credit data (e.g., household income, credit history and/or credit score); financial data (e.g., income sources, income amounts, assets, tax records, loan information, loan history, loan repayments, banking history, banking transactions, financial institutions involved in such transactions, transaction locations, mortgage information, mortgage history, account balances, number of accounts, counterparty information, fraud activity, and/or fraud alerts); and insurance information (e.g. insurance claims, insurance policies, and/or insurance payments received).

The methods of the invention are useful in analyzing data of entities in various sectors including, but not limited to, compliance for banks or other financial institutions, securities investigations, investigations of counterfeiting, illicit trade, or contraband, compliance regarding technology payments, regulatory investigations, healthcare, life sciences, pharmaceuticals, social networking, online or social media marketing, marketing analytics and agencies, urban planning, political campaigns, insurance analytics, real estate analytics, education, tax compliance and government analytics.

Having described the invention in detail, it will be apparent that modifications and variations are possible without departing from the scope of the invention defined in the appended claims.

When introducing elements of the present invention or the preferred embodiments(s) thereof the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above constructions and methods without departing from the scope of the invention, it is intended that all matter contained in the above description and shown in the accompanying drawings shall be interpreted as illustrative and not in a limiting sense.

What is claimed is:

1. A method of cross training a first neural network and a separate second neural network comprising:
   providing a computer system with a computer-readable memory storing computer-executable instructions for the first neural network and the second neural network; and
   providing one or more processors in communication with the computer-readable memory, wherein the one or more processors are programmed by the computer-executable instructions to at least:
   process a first data with the first neural network wherein the first neural network has a first node storing a first weight;
   process a second data with the second neural network wherein the second neural network has a second node storing a second weight;
   update the first weight in the first node by a first delta amount as a function of the processing of the first data with the first neural network;
   update the second weight in the second node by a second delta amount as a function of the processing of the second data with the second neural network; and
   cross train the first neural network by updating the first weight in the first node as a function of the second delta amount and cross train the second neural network by updating the second weight in the second node as a function of the first delta amount;
   wherein a value of the updated first weight is different than a value of the updated second weight after both the first and the second neural networks have been cross trained.

2. The method of claim 1 wherein the computer-readable memory:
stores the first data in a first memory location; and
stores the second data in a second memory location;
wherein the first data is isolated from the second data.

3. The method of claim 1 further comprising:
organizing the first data in a predetermined data format; and
organizing the second data in the same or similar predetermined data format.

4. The method of claim 1 further comprising:
structuring the first neural network with a predetermined network architecture; and
structuring the second neural network with the same or similar predetermined network architecture.

5. The method of claim 1 further comprising:
providing a third neural network separate from the second neural network and the first neural network;
processing a third data with the third neural network wherein the third neural network has a third node storing a third weight;
updating the third weight in the third node by a third delta amount as a function of the processing of the third data with the third neural network;
updating the first weight in the first node of the first neural network as a function of the second delta amount and of the third delta amount.

6. The method of claim 5 wherein the computer-readable memory:
stores the third data in a third memory location;
wherein the first data is isolated from the second data and the third data; and
wherein the second data is isolated from the third data.

7. The method of claim 5 further comprising organizing the third data in the same or similar predetermined data format.

8. The method of claim 5 further comprising structuring the third neural network with the same or similar predetermined network architecture.

9. A computer system for cross training a first neural network and a separate second neural network comprising:
a computer-readable memory storing specific computer-executable instructions for the first neural network and the second neural network; and
one or more processors in communication with the computer-readable memory, wherein the one or more processors are programmed by the computer-executable instructions to at least:
process a first data with the first neural network wherein the first neural network has a first node storing a first weight;
process a second data with the second neural network wherein the second neural network has a second node storing a second weight;
update the first weight in the first node by a first delta amount as a function of the processing of the first data with the first neural network;
update the second weight in the second node by a second delta amount as a function of the processing of the second data with the second neural network; and
cross train the first neural network by updating the first weight in the first node as a function of the second delta amount and cross train the second neural network by updating the second weight in the second node as a function of the first delta amount;
wherein a value of the updated first weight is different than a value of the updated second weight after both the first and the second neural networks have been cross trained.

10. The computer system of claim 9 wherein the computer-readable memory:
stores the first data in a first memory location; and
stores the second data in a second memory location;
wherein the first data is isolated from the second data.

11. The computer system of claim 9 wherein the computer-readable memory:
stores the first data in a predetermined data format; and
stores the second data in the same or similar predetermined data format.

12. The computer system of claim 9 wherein:
the first neural network is structured with a predetermined network architecture; and
the second neural network is structured with the same or similar predetermined network architecture.

13. The computer system of claim 9 wherein:
the computer-readable memory stores specific computer-executable instructions for a third neural network separate from the second neural network and the first neural network; and
the one or more processors are programmed by the computer-executable instructions to at least:
process a third data with the third neural network wherein the third neural network has a third node storing a third weight;
update the third weight in the third node by a third delta amount as a function of the processing of the third data with the third neural network;
update the first weight in the first node of the first neural network as a function of the second delta amount and of the third delta amount.

14. The computer system of claim 13 wherein the computer-readable memory:
stores the third data in a third memory location;
wherein the first data is isolated from the second data and the third data; and
wherein the second data is isolated from the third data.

15. The computer system of claim 13 wherein the computer-readable memory stores the third data in the same or similar predetermined data format.

16. The computer system of claim 12 wherein the computer-readable memory stores specific computer-executable instructions for a third neural network separate from the second neural network and the first neural network; and
the third neural network is structured with the same or similar predetermined network architecture.

* * * * *